(12) United States Patent
Rakowski et al.

(10) Patent No.: US 7,984,484 B1
(45) Date of Patent: Jul. 19, 2011

(54) SYSTEM AND METHOD FOR ASSISTING IN REMOTE MESSAGE SERVER CONFIGURATION

(75) Inventors: Brian D. Rakowski, Menlo Park, CA (US); Darick M. Tong, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 1650 days.

(21) Appl. No.: 10/987,125

(22) Filed: Nov. 11, 2004

(51) Int. Cl.
  *G06F 7/04* (2006.01)
  *G06F 15/16* (2006.01)
  *G06F 17/30* (2006.01)
  *H04L 29/06* (2006.01)

(52) U.S. Cl. .......................... 726/3
(58) Field of Classification Search .......... 726/3
  See application file for complete search history.

(56) References Cited

U.S. PATENT DOCUMENTS

| | | | |
|---|---|---|---|
| 5,208,748 A | 5/1993 | Flores et al. | 364/419 |
| 5,216,603 A | 6/1993 | Flores et al. | 364/419 |
| 5,613,108 A | 3/1997 | Morikawa | 393/616 |
| 5,734,837 A | 3/1998 | Flores et al. | 395/207 |
| 5,948,058 A | 9/1999 | Kudoh et al. | 709/206 |
| 6,185,551 B1 | 2/2001 | Birrell et al. | 707/3 |
| 6,564,213 B1 * | 5/2003 | Ortega et al. | 707/5 |
| 6,578,066 B1 * | 6/2003 | Logan et al. | 718/105 |
| 6,959,325 B2 * | 10/2005 | Gardner et al. | 709/206 |
| 2003/0187951 A1 * | 10/2003 | Shen | 709/219 |
| 2003/0233419 A1 | 12/2003 | Beringer | 709/206 |

FOREIGN PATENT DOCUMENTS

| | | |
|---|---|---|
| WO | WO 00/23931 | 4/2000 |

OTHER PUBLICATIONS

Comer, D.E., "Conversation-Based Mail," ACM Transactions on Computer Systems, vol. 4, No. 4, Nov. 1986, pp. 299-319.
Bellotti, V., et al., "Taking Email to Task: The Design and Evaluation of a Task Management Centered Email Tool," CHI 2003, Apr. 5-10, 2003, Ft. Lauderdale, Florida, vol. 5, No. 1, pp. 345-352.
Bellotti, V., et al., "Taskmaster: Recasting Email as Task Management," Workshop: Redesigning Email for the 21st Century CSCW 2002, , 5 pages.

(Continued)

*Primary Examiner* — Edan Orgad
*Assistant Examiner* — Harris C Wang
(74) *Attorney, Agent, or Firm* — Morgan, Lewis & Bockius LLP

(57) ABSTRACT

When a user enters an email address associated with a remote message server account in a configuration area on a display, one or more suggestions for other field inputs are made based on canonical data or historical data from a variety of users. If the user cannot find a desired entry in the suggestions, the user may enter new information. The newly entered information (once validated) improves the prediction capability for subsequent users. A database stores information associated with each email address domain name including one or more remote message server names, one or more username patterns and ranking values. When more than one suggestion for a field is presented to a user, the suggestions are ranked in accordance with the respective ranking values such as by the popularity of a particular configuration.

49 Claims, 8 Drawing Sheets

| | |
|---|---|
| Email address: | userA@xyzz.com |
| Password: | ************************ |
| POP Server: | pop1.xyzz.com |
| Username: | select |
| Enable automatic download: | userA |
| When Retrieving Email: | userA@xyzz.com |
| Download Email: | enter name |
| Download Folder: | location  [Browse] |

OTHER PUBLICATIONS

Flores, F., et al., "Computer Systems and the Design of Organizational Interaction," ACM Transactions on Office Information Systems, vol. 6, No. 2, Apr. 1998, pp. 153-172.

Shepherd, A., et al., "Strudel—An Extensible Electronic Conversation Toolkit," CSCW 90 Proceedings, Oct. 1990, pp. 93-104.

Venolia, G.D., et al., "Supporting Email Workflow," Microsoft Research Technical Report, MSR-TR-2001-88, Dec. 2001, 11 pages.

Winograd, T., "A Language/Action Perspective on the Design of Cooperative Work," Human-Computer Interaction, vol. 3, 1987-1988, pp. 3-30.

Winograd, T., "Where the Action is," BYTE Magazine, Dec. 1988, pp. 256A-258.

Zawinski, J., "Message Threading," http://www.jwz.org/doc/threading.html, 2002, 9 pages.

* cited by examiner

200

| | | |
|---:|:---:|:---|
| Email address: | name@server.com | |
| Password: | ************************ | |
| POP Server: | pop.server.com | |
| Username: | username | |
| Enable Automatic Download: | Yes | ▼ |
| When Retrieving Email: | Delete From Server | ▼ |
| Download Email: | Hourly | ▼ |
| Download Folder: | location | Browse |

Figure 2

| | |
|---:|:---|
| Email address: | userA@xyzz.com — 402 |
| Password: | ************************ — 404 |
| POP Server: | select — 408 |
| Username: | pop1.xyzz.com — 410 |
| Enable automatic download: | pop.abc.xyzz.com — 412 |
| When Retrieving Email: | enter name |
| Download Email: | Hourly |
| Download Folder: | location [Browse] |

| | |
|---:|:---|
| Email address: | userA@xyzz.com |
| Password: | ************************ |
| POP Server: | pop1.xyzz.com — 504 |
| Username: | select — 506 |
| Enable automatic download: | userA — 508 |
| When Retrieving Email: | userA@xyzz.com — 510 |
| Download Email: | enter name |
| Download Folder: | location [Browse] |

SYSTEM AND METHOD FOR ASSISTING IN REMOTE MESSAGE SERVER CONFIGURATION

TECHNICAL FIELD

The present invention relates generally to configuring electronic message programs, and in particular to assisting a user in configuring an electronic message program for connection to a message server.

BACKGROUND

The Post Office Protocol (POP), commonly known in its third version as POP3, provides a way for electronic messaging programs such as Outlook (from Microsoft Corporation) and Thunderbird (from Mozilla.org) to interface with a central, remote message server. Oftentimes, a user may not have the messaging program up, running and connected to the central message server for number of reasons. POP provides a simple protocol for retrieving messages from the central message server so that the messages can be manipulated on the user's client computer without requiring continuous connection to the central message server.

Messaging programs such as Outlook and Thunderbird, however, must be configured to interact with the message server implementing POP. Typically a user is required to specify at least the following parameters in order to establish a valid POP connection: email address, password, user name, POP server name, and whether the POP server requires "secure password authentication". Unfortunately, knowledge of the user's email address and password is not sufficient, and the other POP setup parameters cannot be simply guessed from the user's email address. For instance, different POP service providers use different naming conventions for naming their POP servers, and may also use different POP servers for different sets of users, thereby making it difficult to determine the POP server name if one knows the domain name portion of the user's email address but does not have access to the POP setup instructions provided by the POP service provider.

It would be desirable to provide assistance to users with one or more of these inputs as they configure a messaging program to interface with a POP server.

SUMMARY

According to one embodiment of the invention, a method for providing remote message server configuration information includes receiving an electronic mail address from a user. One or more field suggestions associated with a remote message server configuration field based on stored information are identified. The one or more field suggestions are presented to the user in a graphical user display.

According to another embodiment of the invention, a method for providing remote message server configuration information includes receiving a request for remote message server configuration information, the request including an electronic mail address. One or more remote message server configuration patterns from a remote message server configuration database are identified using at least a portion of the electronic mail address. The one or more POP configuration patterns are provided in response the request.

BRIEF DESCRIPTION OF THE DRAWINGS

The aforementioned features and advantages of the invention as well as additional features and advantages thereof will be more clearly understood hereinafter as a result of a detailed description of embodiments of the invention when taken in conjunction with the drawings. Like reference numerals refer to corresponding parts throughout the several views of the drawings.

FIG. 2 depicts a portion of an exemplary graphical user interface display in accordance with an embodiment of the present invention.

FIG. 4 depicts a portion of an exemplary graphical user interface display suggesting inputs for a POP server field in accordance with an embodiment of the present invention.

FIG. 5 depicts a portion of an exemplary graphical user interface display suggesting inputs for username field in accordance with an embodiment of the present invention.

DESCRIPTION OF EMBODIMENTS

Figure 1A:
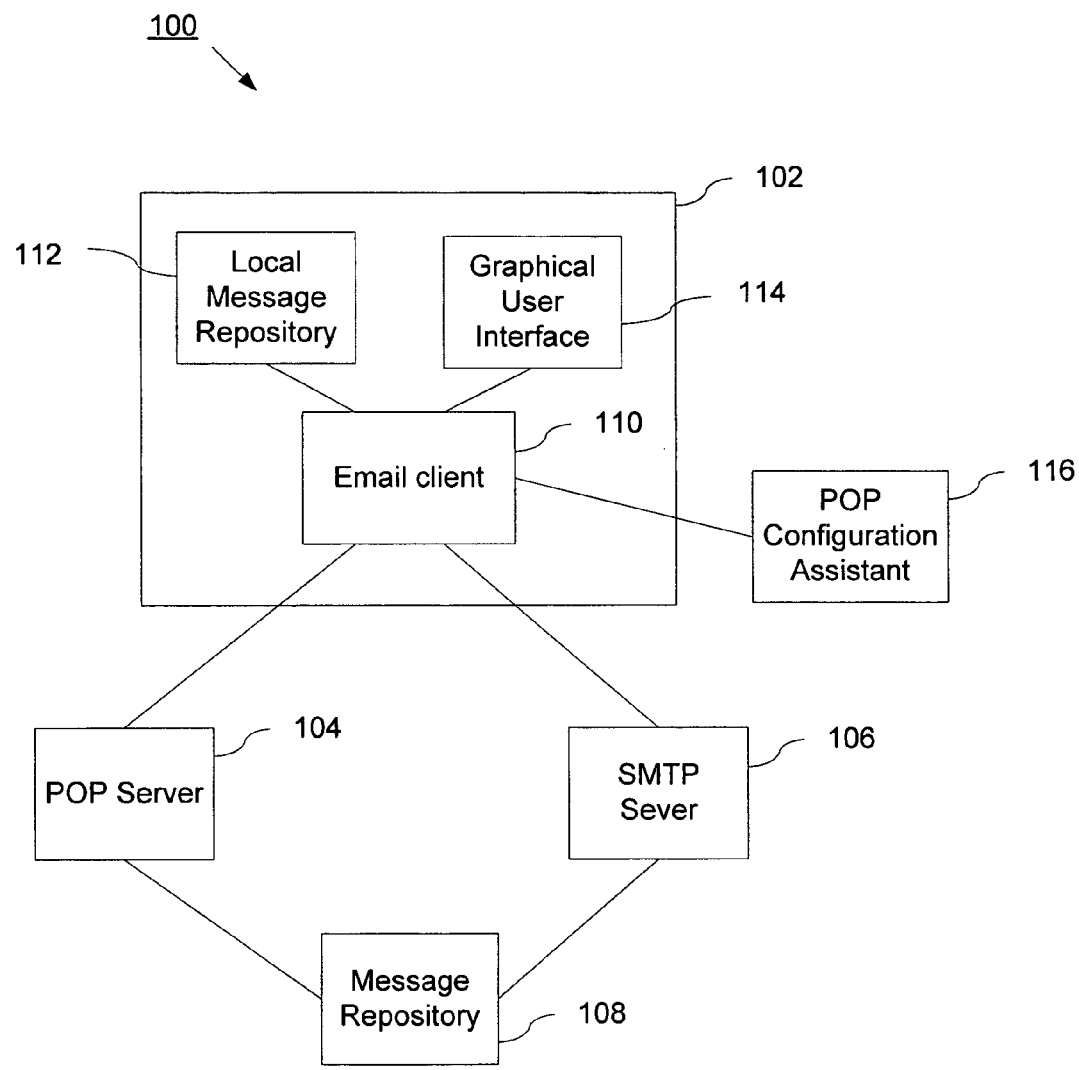
FIGS. 1A and 1B depicts block diagrams in accordance with first and second embodiments of the present invention.

A user wishing to have an electronic mail (email) client interact with a remote message server must configure certain settings for the email client. These settings provide information necessary to create the remote message server connection. These settings include, for example, the user's email address and password, the name or interne protocol (IP) address of the remote message server to which the email client is to be connected and the username that the remote message server associates with the user's remote message server account. There may be additional settings as well as user preference information that the user may set. As described below, in some embodiments, when a user enters the user's email address, or the domain name portion thereof, into a graphical user display for configuring the remote message server connection, one or more suggestions are provided for one or more of the other configuration or preference settings. The suggestions are based on configuration settings successfully used by a community of users and may be ordered according to various criteria, such as a popularity of use.

One environment in which embodiments of the invention may operate includes a client application, such as an email client, communicating with a server implementing POP (e.g., POP3). Systems in which a client application can access a POP server may include a client application, a POP server, a Simple Mail Transfer Protocol (SMTP) server, a message repository and a POP configuration assistant. As illustrated in FIG. 1, an exemplary system 100 includes a client 102, a POP server 104, an SMTP server 106, a message repository 108 and a POP configuration assistant 116. The client 102 includes an email client 110, a local message repository 112 and a graphical user interface 114. The email client 110 communicates with the POP server 104 and the SMTP server 106, as well as the local message repository 112 and the graphical user interface 114. The email client 110 also communicates with the POP configuration assistant 116. In some embodiments, at least a portion of configuration assistant 116 is part of email client 110. The POP server 104 and the SMTP server 106 communicate with the message repository 108. The various connections between the email client 110, the POP server 104, the SMTP server 106, the message repository 108 and the POP configuration assistant 116 may be provided as network links (physical, optical, wireless or otherwise) on a local area network, a wide area network, the Internet or other type of network, or a combination of such networks. It is sufficient that the connections permit communication through the use of appropriate protocols.

Although the POP server 104, the SMTP server 106 and the message repository 108 are illustrated as discrete elements in FIG. 1, it should be understood that in some embodiments each may be implemented using multiple servers so as to improve throughput, reliability or other factors, all three could be implemented on the same server, or in various combinations. For instance the SMTP server 106 could be implemented on several distinct servers that communicate with and work in conjunction with each other to enable the functions and features of the SMTP server 106. In another example, the POP server 104 and the SMTP server 106 could be implemented on the same server and the message repository 108 could be implemented on a plurality of servers.

The POP server 104 is a server that permits access to a user's messages stored in the message repository 108 using one or more versions of POP, depending on the version or versions of POP implemented by the POP server 104. POP allows a user to download electronic mail messages stored on a remote server via local messaging clients, for example, Outlook, Outlook Express, Eudora and Thunderbird. POP allows a user to work in an off-line mode: the user downloads his or her messages and then reads them off-line. Although described in relation to POP, it will be readily apparent that the concepts and embodiments described herein will apply equally well to other types of remote mail protocols, including but not limited to the Internet Message Access Protocol (IMAP) and the Simple Mail Transfer Protocol (SMTP). Moreover, the techniques and concepts described herein apply equally well to configuring services where configuration settings may not be obvious to the user.

A user interacts with the email client 110 on the client 102 using the graphical user interface 114. The client 102 any be any number of devices including a desktop computer, personal digital assistant (PDA), wireless device, gaming console, interne kiosk, workstation, portable computer, server and the like. It is sufficient that the client 102 enable a user to interact with the email client 110 and communicate with the POP server 104 and/or the SMTP server 106, as appropriate.

In some embodiments, the email client 110 is an application (e.g., Outlook, Outlook Express, Eudora, or Thunderbird) that interacts with the POP server 104 using POP3. It is sufficient that the email client 110 be able to communicate with the POP server 104 or other mail servers using the appropriate protocols. In some embodiments, the email client 110 interacts with multiple POP servers and/or other mail servers which may operate using other protocols. When the email client 110 implements POP, it may interact with the POP server 104 to access messages stored for the user at the message repository 108. For example, using POP3, an email client 110 can download messages from the POP server 104 to the email client 110 for subsequent processing and storage in local message repository 112.

An SMTP server 106 may be associated with a POP mail account so that messages can be sent by the user of the account. SMTP is a protocol for sending email messages from a user's email account. From another viewpoint, SMTP handles routing, acceptance and delivery of email messages between email servers. The SMTP server 106 and the POP server 104 typically work together on the same repository of messages (such as message repository 108) for a particular message account. In some systems, they are implemented in the same server, although they do not need to be.

Before an email client (e.g., email client 110) can interface with a POP server (e.g., POP server 104), the email client must be properly configured. In some embodiments, the email client 110 communicates with a POP configuration assistant 116 to assist the user in configuring the POP settings and preferences for the POP connection. In some embodiments, the POP configuration assistant 116 is resident on a server, while in some embodiments the POP configuration assistant 116 is partially resident on the client 102. As discussed herein, the term "client" is used herein only to indicate the relationship between the email client 110 and the POP server 104. For example, the email client 110 could be resident on a central server that multiple users may access from across a network (e.g., the Internet) using a web-based interface. In some embodiments, the email client 110 is local to a particular computer, but the configuration assistant 116 is centrally located and used by a community of users. In some embodiments, the email client 110 includes an interface component allowing communication with the POP configuration assistant 116. In some embodiments, the interface component is an add-on program that works in conjunction with an email client 110. In some embodiments, portions of the POP configuration assistant 116 are incorporated into the email client 110.

FIG. 2 depicts an exemplary graphical user interface 114 in the form of a POP configuration settings and preferences window 200 that allows a user to configure email client 110 to access a POP server and set certain preferences. Some of the fields are associated with settings that are required for the email client 110 to access the user's account on the POP server 104, while others are user selectable preference settings which govern activities associated with the connection such as when and how often the email client 110 accesses the POP server 104 and where messages are to be stored. The required settings include the name of the POP server 104, the user's username for the account at the POP server 104 and in many instances, the password used to log into the account. In some embodiments, another required setting is an indication (e.g., yes or no) as to whether or not the POP server requires secure password authentication. The preference settings include, for example, whether to automatically download messages from the POP server to the email client, what actions to take after a message is retrieved from the POP server (such as deleting it from the server), how often to download messages and the location of where the messages should be downloaded.

Figure 1B:
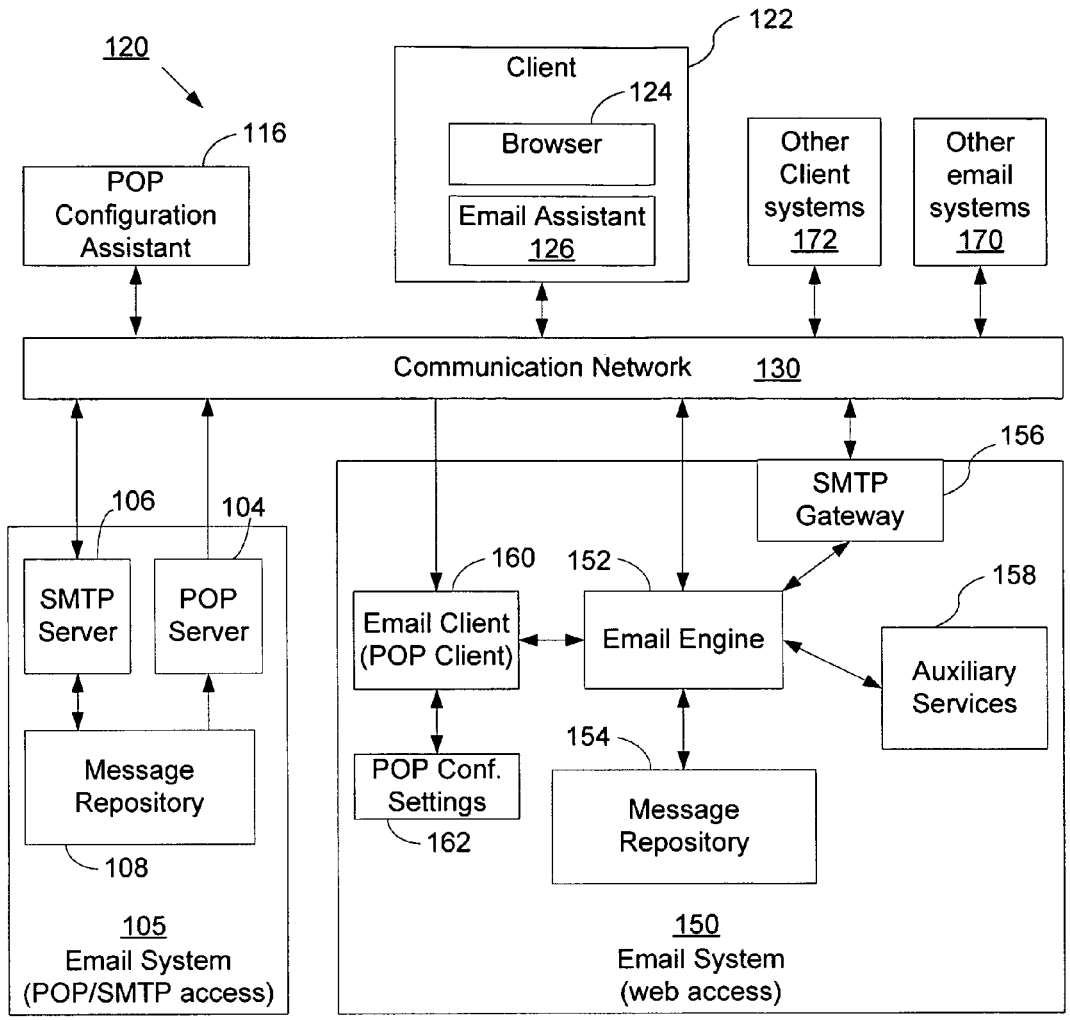

FIG. 1B shows another system 120, somewhat more complex than the system 100 shown in FIG. 1A. In this system, a user of client system 122 has email accounts on two email systems: a first, POP/SMTP based email system 105, and a second, web-based email system 150. The second email system 150 includes an email client 160 for moving messages from the first email system 105 into the second email system 150, thereby enabling the user to access all of his or her email messages through the web-based email system 150. The client system 122, first and second email systems 105, 150, the POP configuration assistant 116, and other systems or devices 170, 172, are interconnected by one or more communication networks 130, such as a local area network, a wide area network, the Internet or other type of network, or a combination of such networks. The second email system may move messages (e.g., messages belonging to multiple users) from many other email systems 105, 170 into the message repository 154 of the second email system 150, with the first email system 105 being just one of those many email systems. In other embodiments, the second email system 150 may be any type of email system, and the first email system 105 may be any type of email system that includes a POP server 104 or interface. In some embodiments, the second email system 150 includes an SMTP server or gateway 156 for sending and receiving email messages to and from other email servers 105, 170, and may include one or more auxiliary services modules and/or servers 158 for providing such services as spell checking, spam filtering, account management services and the like.

The client system 122 may include a browser application 124 for accessing web pages and other documents and services, including email messages stored in the second email system 150. In some embodiments, the client system 122 may include another application, herein called an email assistant 126 or client assistant, which facilitates communications between the client system 122 and one or more servers or services, such as the second email system 150. In some embodiments, the email assistant 126 is an application downloaded from the second email system 150 or other server, and used by the client system 150 to access, compose and display email messages.

The client system 122 configures an email client 160 of the web based email server 150 to download mail from the message repository 108 of the first email server 105 into the message repository 154 of the web based email server 150. The email client 160 of the web-based email system 150 uses POP configuration settings 162 specified by a user of the client system 122 with the assistance of the POP configuration assistant 116. Those POP configuration settings 162 specify the POP server 104 to be accessed, as well as other parameters such as username and password, for retrieving messages in the first email system 105. Additional users of the second email system 150 may have email accounts in both the second email system 150 and other email systems 105, 170. These other users, using a variety of client systems and devices 172, may also specify POP configuration settings 162 for the email client 160 of the second email system 150 to use for copying or transferring messages from those other email system to the second email system 150.

Referring to FIG. 2, a number of entry fields are associated with labels indicating the name of the entry field. The "Email address" label 202 has an associated email address field 204 into which a user enters the email address associated with the user's POP account at the POP server 104 (e.g., "name@server.com"). The email address "name@server.com" consists of a prefix "name" and a suffix "server.com". The prefix identifies the user's email account in the domain identified by the suffix, is the user's name to which emails are sent, and may or may not be related to the user's actual name. The domain identified by the suffix, "server.com", may include one or more POP servers, and thus there may not be a one-to-one correspondence between the email address suffix and the POP server that services the email account identified by the email address. A server can be represented in one of two ways; numerically by IP address (e.g., 216.239.57.107) or by an easier to remember multi-level domain name (e.g., "gmail.com"). Domain name servers can provide mapping services to map domain names to IP addresses since the actual machine to machine connections are made using their IP addresses. As represented by a domain name, the name of a server is composed of two or more domain components separated by dots. The right-most component (e.g., "com") is considered the top-level domain. The component to the left of the top-level domain is considered the second-level domain (e.g., "gmail"). Other levels may also exist, although in practice, most email addresses include only a second level domain in the address (e.g., sampleuser@gmail.com). In general, many different names may be supported by a single server. Many users tend to easily remember their email addresses. A "Password" label 206 has an associated password field 208 into which a user enters the user's password for the account at the POP server 104. As the user enters characters into the field, the display may show alternate characters (e.g., "*") to prevent the actual characters of the password from being displayed. Like the email address field 204, a user typically remembers his or her password without much effort.

A "POP Server" label 210 has an associated POP server field 212 into which a user enters the name of the POP server 104 that service's the email account (sometimes called the POP account) associated with email address. Generally, the name of the POP server is obtained from the provider of the POP server 104. Providers may use different conventions for naming their server (e.g., popmail.someprovider.com, pop3.someotherprovider.com or username.pobox.someprovider.com). Accordingly, a user may not readily know the name of the server without asking the provider or having the name easily accessible. A "Username" label 214 has an associated username field 216 into which a user enters the username for the user's account at the POP server. Generally, this too is obtained from the provider of the POP server. Providers may use different conventions for usernames and so a user may not readily know the username without asking the provider or having the information easily accessible. Two common forms of usernames are: 1) the email address prefix (e.g., "name" from "name@server.com"); and 2) the whole email address (e.g., "name@server.com").

In some embodiments, a number of other settings and preferences may be provided for a user to configure. For example, a user may be able to configure the email client 110 to automatically download messages from the POP server 104. An "Enable Automatic Download" label 218 is associated with a selection box 220 whereby the user selects whether to allow automatic download of messages. When a user selects the down arrow in selection box 220, the user is presented with the choices for automatic download (e.g., yes or no) from which to select. The user may also choose various options for what actions occur at the server when emails are downloaded. A "When Retrieving Email" label 222 is associated with a selection box 224 whereby the user may select an option presented to the user after selecting the down arrow (e.g., "Delete From Server" or "Leave on Server"). The user may also choose how often messages are downloaded. A "Download Email" label 226 is associated with a selection box 228 whereby the user selects a time period (e.g., "Hourly" or "Daily") for the connection to periodically be made. Selecting the down arrow causes time periods to be displayed from which the user could select. The user may also choose the location for downloaded messages. A "Download Folder" label 230 is associated with a text box 232 in which the user may enter a location, for instance by entering the path and folder name of a local folder, in which messages are to be placed. If the user selects the "Browse" button, the user may choose various locations and folders by browsing the directory structure. In some embodiments, such as the embodiment shown in FIG. 1B, the download folder field 232 is not provided, because all retrieved messages are placed in the user's email account in the second email service and thus are not copied to a storage location in the user's local computer.

Some of the above-mentioned additional settings and preferences may have default values for the fields inserted into the display.

In some embodiments, additional fields may exist such as a POP connection port which tells the email client 104 on which port to request connection to the POP server 104, whether the POP server 104 requires a secure connection (e.g., SSL), or whether to use secure password authentication (SPA). Additionally, a "done", "save", "OK" or other similar type button may be present for the user to indicate that he or she has finished entering configuration settings and preferences information.

Figure 3:
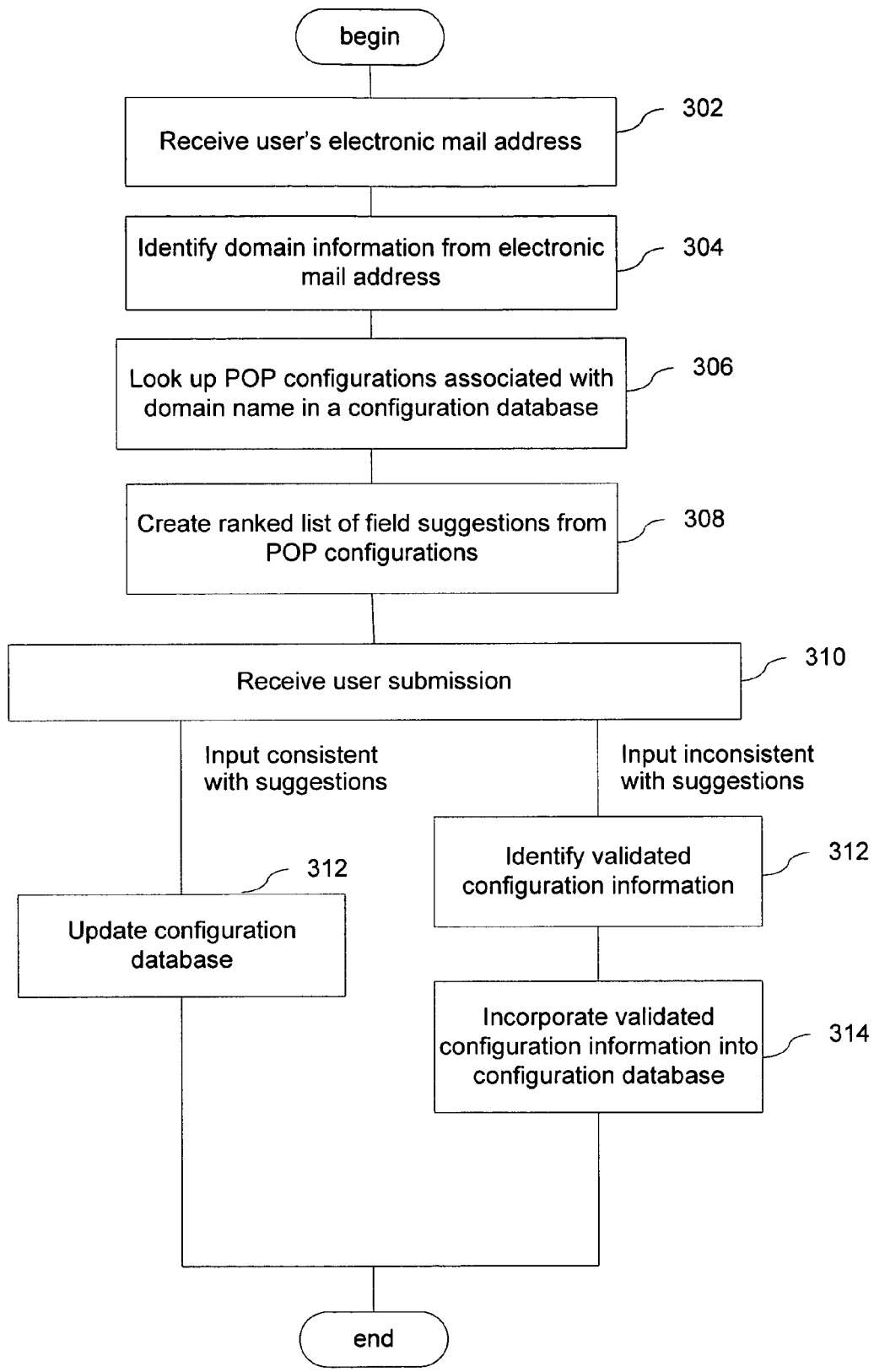
FIG. 3 depicts a process flow in a POP configuration assistant in accordance with an embodiment of the present invention.

As mentioned earlier, it would be desirable if one or more of the requested fields that the user enters when setting up a POP connection could be suggested for the user. These suggestions can be made based on previously entered information, either by a system administrator or learned over time from validated connections from a community of users. A process carried out by a POP configuration assistant 116 according to some embodiments of the invention can be understood with reference to FIGS. 2 and 3. Although described in terms of a POP configuration, one of ordinary skill in the art will readily recognize the techniques apply equally well to other protocols such as IMAP.

Initially, the user enters his or her email address into the email address field 204. The POP configuration assistant 116 receives the email address (302) and extracts the email name portion and a domain name portion (304). For example, the email address "sampleuser@gmail.com" is separated into "sampleuser" as the email name portion and "gmail.com" as the domain name portion. The "@" symbol serves as a separator between the email name portion and the domain name portion. The domain name portion of the address is used to look up POP configurations which form the basis for suggestions presented to the user (306). As will be explained below, the POP configurations are obtained from a POP configuration database which is populated with various patterns associated with a domain name. The patterns can be administratively entered or learned from user input over time from a community of users which utilize the POP configuration assistant 116. Of course, when the POP configuration assistant 116 encounters a domain name not previously encountered or for which no information has been entered, it will not have a specific configuration associated with the domain name. In some embodiments, the POP configuration assistant 116 responds to a newly encountered domain name with one or more default configuration suggestions.

When the POP configuration database contains configurations associated with the domain name identified at 304, one or more suggestions for one or more of fields are presented to the user. In some embodiments, the fields for which the one or more suggestions are provided are the POP server field 212 and the username field 216. In some embodiments, when more than one suggestion for a field is provided, the suggestions are ordered according to various ranking information (308). For example, the suggestions could be ranked according to a frequency of the number of users using that particular configuration. The suggestions could also be ranked according to characteristics associated with the user. For example, information supplied by the user or information detected about the user could indicate a geographical location of the user and that information could affect the ranking of the suggestions: a server with a known geographical location close to the user would be ranked above one further away from the user.

If the user selects one of the provided suggestions, then that suggestion is placed into the field. On the other hand, the user may decide to edit one of the suggestions or provide information not reflected in the suggestions. After the user has completed the configuration form (e.g., selecting an "OK" button on the graphical user interface), the POP configuration assistant 116 receives the user submission and examines the entered fields (310). If the submitted POP configuration information is consistent with the suggestions, then the POP configuration assistant 116 updates the POP configuration database by modifying the statistical information associated with the pattern(s) to reflect an additional user (312). However, when the user submits information inconsistent with the suggestions, this input is detected and processed. If the POP assistant determines that the submitted information resulted in a valid POP configuration (312), then the POP configuration assistant 116 incorporates the new pattern information into the POP configuration database (314). If the connection is not valid, then the information is not incorporated. In some embodiments, validation of the POP configuration information entered by the user is performed by a system other than the POP configuration assistant 116. For instance, the POP configuration validation may be performed by an email server 150 (FIG. 1B), which then sends a validation result (and perhaps the POP configuration information as well) to the POP configuration assistant 116 for incorporation into the POP configuration database.

FIG. 4 provides an illustration of one embodiment of the invention. After the user has entered at least the email address ("userA@xyzz.com," in this example) in text box 402 of the graphical user interface, a suggestion area 404 is displayed associated with the "POP Server" label 406 which provides zero or more suggestions for the POP server field. The entry of the email address in text box 402 can be detected in a number of ways, such as such as detecting when the user has entered the end of a top level domain string, when the user presses the "tab" key to move to another field, when the user presses the "enter" key, when the user moves the cursor out of the text box 402, or by detecting some other user action.

The exemplary suggestion area 404 illustrates two representative POP server suggestions: "pop1.xyz.com" 408 and "pop.abc.xyzz.com" 410 representing two different servers associated with the domain "xyzz.com" entered into text box 402 by the user as part of the email address. The number of suggestions presented to the user depends on a number of factors. For example, if no POP configuration information is associated with the identified domain name portion entered into text box 402, then no suggestion will be presented and the user may enter the name manually. However, in some embodiments, a default POP server name is presented based on, for example, a common pattern found among other entries. For example, if the email address was "userB@hostisp.com", a suggestion of "pop.hostisp.com" could be provided, that is, prepending "pop" as a third level domain name to the domain name of the email address. In some embodiments, if more than one configuration is associated with a particular domain, then those suggestions are ranked according to various criteria. In some embodiments, the suggestions are ranked in accordance with how many users had been associated with the POP server. In some embodiments, the suggestions are ranked in accordance with information received from or detected about the user. For example, a server in the same geographic location as the user is ranked above a server in another geographical location. In some embodiments, a pattern for a POP server name is identified from previous entries and applied to provide a suggestion for the POP server name. For example, a pattern might be identified which uses the username of the user in the POP server name (e.g., "userB.pobox.xxyyzz.com"), where "userB" is the username. The user is also provided an "enter name" option 412 that allows the user to manually enter a POP Server (the actual name of the option 412 is a design choice).

The suggestion area 404 could be presented to the user in a number of variations, only one of which is discussed above. For example, the top most suggestion could be placed into the field associated with POP Server label 406 with a drop down window allowing the user to select a different server (if other choices exists). In another example, the user could manually modify the entry in the field without needing to select an "enter name" option 412.

FIG. 5 depicts the display of suggestions associated with the "Username" label 502. A suggestion area 504 is displayed to the user in the graphical user interface which contains zero or more suggestions, depending on the number of suggestions available. Generally though, the username associated with a POP account is one of two forms: the email name portion or the entire email address (e.g., "userA" 506 and "userA@xyzz.com" 508, respectively). An "enter name" option 510 is also provided allowing the user to manually enter a different entry. As before, the suggestions can be ordered according to the number of users associated with the particular pattern at the POP server. In some instances, the selection of the POP server leads to a preferred username pattern which is associated with the particular POP server. This pattern would be ranked higher than any other pattern.

The user interfaces in FIGS. 4 and 5 serve only to provide examples of some embodiments of the invention. In those or some other embodiments, the user may be prompted with a preliminary text input area for the user's email address at the POP server along with a way to indicate the user has completed entering the email address (e.g., a "Next" or "OK" button). After indicating that the email address has been entered, one or more of the fields are populated with suggested configurations and settings. For example, in one embodiment, all of the fields whose values can be predicted based on the user specified email address are populated with suggested settings in response to entry of the email address. The user may then enter a password, modify the suggested settings, and so on, to complete the specification of the POP configuration settings.

After the user has finished completing the POP configuration settings and preferences window by entering text and/or selecting suggestions, the user indicates that the settings should be saved. This can be accomplished by, for example, selecting an "OK" button within the graphical user interface (not shown). Referring back to FIGS. 1 and 2, the POP configuration assistant 116, or in some embodiments, the email client 150 (FIG. 1B) or 110 (FIG. 1A), then attempts to validate the settings by connecting to the POP server 104 using the entered fields. For example, the POP configuration assistant 116 attempts a POP session with the POP server in the POP server field 212 using the username in the username field 216 and the password in the password field 208. If the POP configuration assistant 116 is able to make a successful connection, the configuration settings and preferences are stored in memory (e.g., in POP configuration settings database 162, FIG. 1B, or in a configuration file of the email client 110 in FIG. 1A) and associated with the user. In some embodiments, the POP configuration assistant 116 uses the successful connection information to update statistical information associated with a particular configuration in a POP configuration database. As mentioned above, the configuration information can be consistent with or inconsistent with the suggestions provided from the POP configuration database. When the configuration settings are consistent with the suggestions, the database is updated to reflect another user of the configurations. When the configuration settings are inconsistent with the suggestions, then the database is modified to take into account the new configurations.

Figure 6:
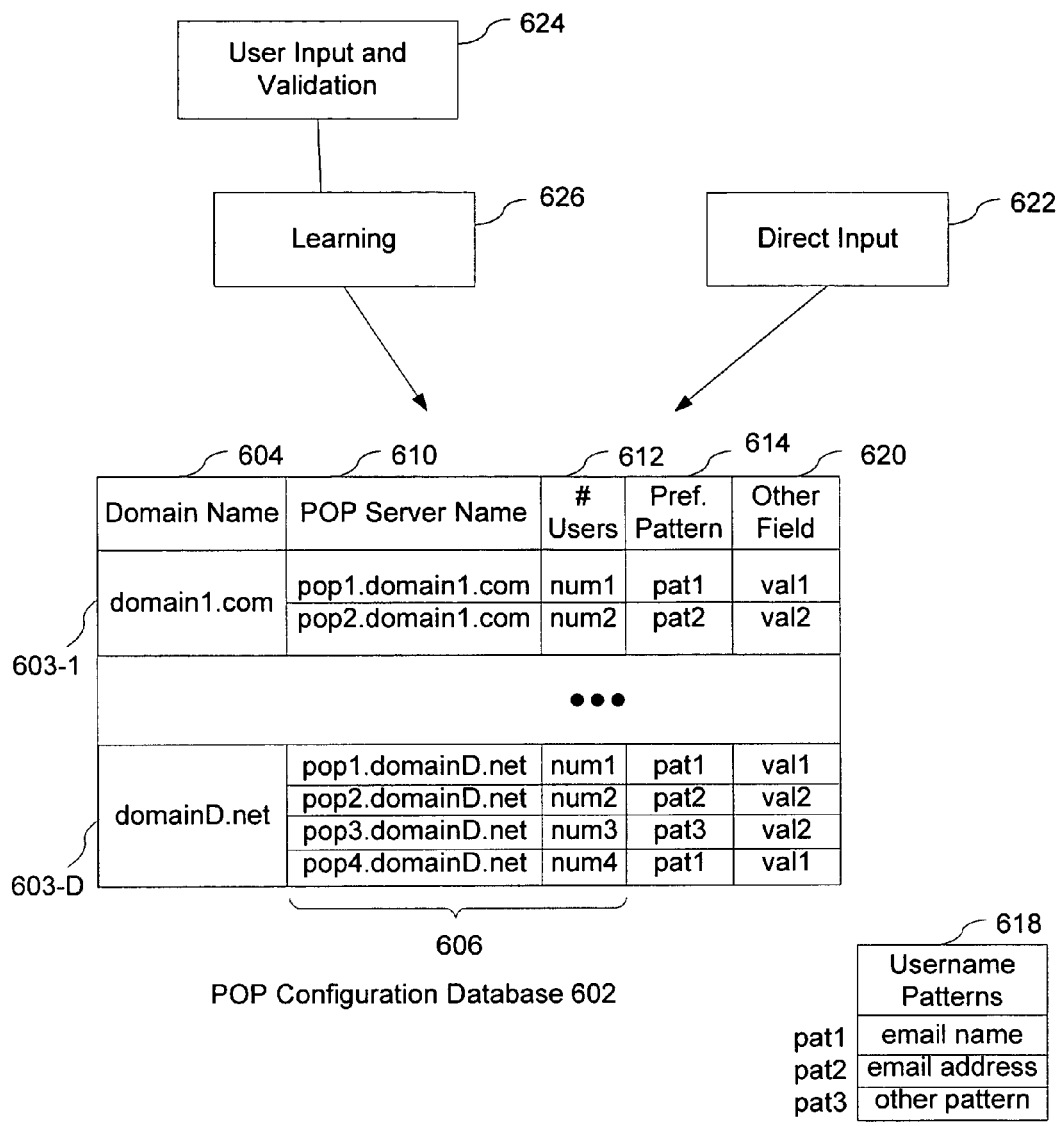
FIG. 6 depicts information flow into a POP configuration database in accordance with an embodiment of the present invention.

The creation and modification of a POP configuration database according to some embodiments of the invention can be understood in reference to FIG. 6. A POP configuration database 602 includes domain records 603-1 though 603-D, where D represents the number of domains for which configuration patterns are stored. Each domain record 603 includes at least a domain name field 604, a server field 606, and a username preferred pattern field 614. A domain record 604 could also contain additional fields 620 indicating additional configuration settings such as the authentication style (e.g., passwords, APOP, Kerberos, and so on), server port and so on. In some embodiments, the additional settings are associated with a particular POP server in the domain and in some embodiments they are associated with the domain.

The domain name field 604 contains the domain name as described above. In most instances, the domain name is the part of the email address following the "@" character and is the primary mechanism by which the domain configurations are identified when the user has input the email address into email field (e.g., field 204 of FIG. 2). That is, the POP configuration database 602 is searched for the domain name. As described earlier, the portion of the email address following the "@" contains at least a top level domain (e.g., "com", "net", "biz" and so on) and a second level domain (e.g., "gmail" from "gmail.com"). In some instances, other domain levels could be included such as a third or fourth level domain (e.g., "eng" in "eng.uiuc.edu").

The server field 606 includes at least a POP server name field 610 and number of users field 612. For a domain record 603, the POP server name field 610 contains one or more POP server names (e.g., "pop1.domain1.com" of 603-1) associated with the domain name in domain name field 604 (e.g., "domain1.com" of 603-1). In many instances the POP server name will include the domain name (i.e., the top and second domain levels) and one or more other domain levels (e.g., "pop1" in 603-1). In some instances, the POP server name field 610 will contain a server name pattern, such as "username.pobox.domain-name", where "username" is the user name of the user and "domain-name" is the domain name (e.g., "gmail.com") of the user's email address. Associated with each POP server name in the POP server name field 610 is a number of users field 612 indicating the number of users associated with that particular POP server name. Initially, this number will be zero if no users have yet been associated with the POP server when the POP server names are first entered (e.g., automatically based on one or more well known POP server name patterns). The number in field 612 will begin at one when the POP configuration assistant 116 detects a new, valid configuration for which it previously did not have an entry and creates one, or when it detects a first valid configuration for an automatically or speculatively entered entry. Of course, the administrator could set the number of users associated with any configuration to any value. As more users enter validated information consistent with the suggestions, this number will increase over time. In some embodiments, a username preference pattern field 614 indicates which username pattern, of a predefined set 618 of username patterns, is preferred for an associated POP server name. The predefined set 618 of username patterns may be stored in a table or other data structure, or may be embedded in the program instructions of the POP configuration assistant. As mentioned above, other fields may be associated with a particular POP server, such as a geographical field indicating a geographical location associated with a particular POP server.

As mentioned above, the POP server field 610 may contain one or more POP server names. POP service providers may utilize more than one POP server for a number of reasons. In some instances, POP server providers may have POP servers geographically dispersed and a user's primary POP server is the one located in the user's geographical region. In some instances, POP service providers may spread users over multiple POP server for load balancing or other reasons.

The set of predefined username patterns 618 includes at least two username patterns. As mentioned earlier, in most instances, the pattern will be one of two types, either the email name (i.e., that portion of the email address before the "@") or the full email address. However, in some embodiments, other username patterns may be identified. Of course, different servers within the same domain may use different username patterns. As mentioned earlier, one of the patterns may be preferably associated with a particular POP server name in the preferred pattern field 614.

The POP configuration database 602 is populated in two main ways including administrative input and validated user input, both of which are functionally indicated in FIG. 6. A direct input 622 includes an administrator entering configuration information manually or by an automated process. For example, POP service providers could provide configuration information to an administrator who could enter the information into the POP configuration database 602. In one embodiment, the configuration database 602 is initially populated by accessing the validated POP configurations for a community of users, for instance users who have successfully configured one or more email clients without the help of the POP configuration assistant 116. These validated POP configurations are then processed by the POP configuration learning procedure 626, which populates the configuration database 602 with an initial set of entries. If the set of previously validated POP configurations is sufficiently large, many of the initial users of the POP configuration assistant will receive correct configuration suggestions, thereby reducing the training or break-in period for the POP configuration assistant.

The POP configuration database 602 may be populated by detecting validated user information and learning configuration information from the validated information. When the POP configuration assistant 116 encounters configuration information already present (i.e., consistent with the provided suggestions), it updates the number of users fields 612 and 620 as applicable to indicate an additional user having that configuration. On the other hand, when the email client encounters validated user information that is new or inconsistent with provided suggestions, the email client examines the configuration information to extract information relevant to the POP configuration database 602 to learn the new configuration and any associated patterns (e.g., the pop server name and username pattern). If the POP configuration assistant 116 detects that no domain record entry exists for the domain entered, a new domain record 603 is created in POP configuration database 602 for that domain. The POP server name portion 606 is populated with the identified pop server name from the validated information and the number of users is set to one. An entry in the username patterns field 618 is created for the identified username and the associated number of users 620 is set to one. A username pattern identifier, corresponding to the validated username, may also be stored in the preferred pattern 614 for the POP server 610. If the POP configuration assistant 116 is able to populate any other existing fields, it does so (e.g., security type and server port number). It is possible that the POP configuration assistant 116 client learned a new configuration from another user while the current user's information is being validated. If so, the email client will find an entry in the POP configuration database 602 for the learned information, and will in that instance, just increase the number of users field or fields 612 and 620 as applicable.

If the email client detects that a domain record does exist, then it adds as appropriate an additional POP server in the POP server field 610 (and associated number of user field 612 and preferred pattern field 614) or an additional username pattern 618 (and associated number of users field 620) whenever a new POP server or username pattern is first validated for that domain.

Over time, the POP configuration database 602 will represent information from a number of users and can be used to assist subsequent users when configuring POP connections by providing historically gathered suggestions.

Figure 7:
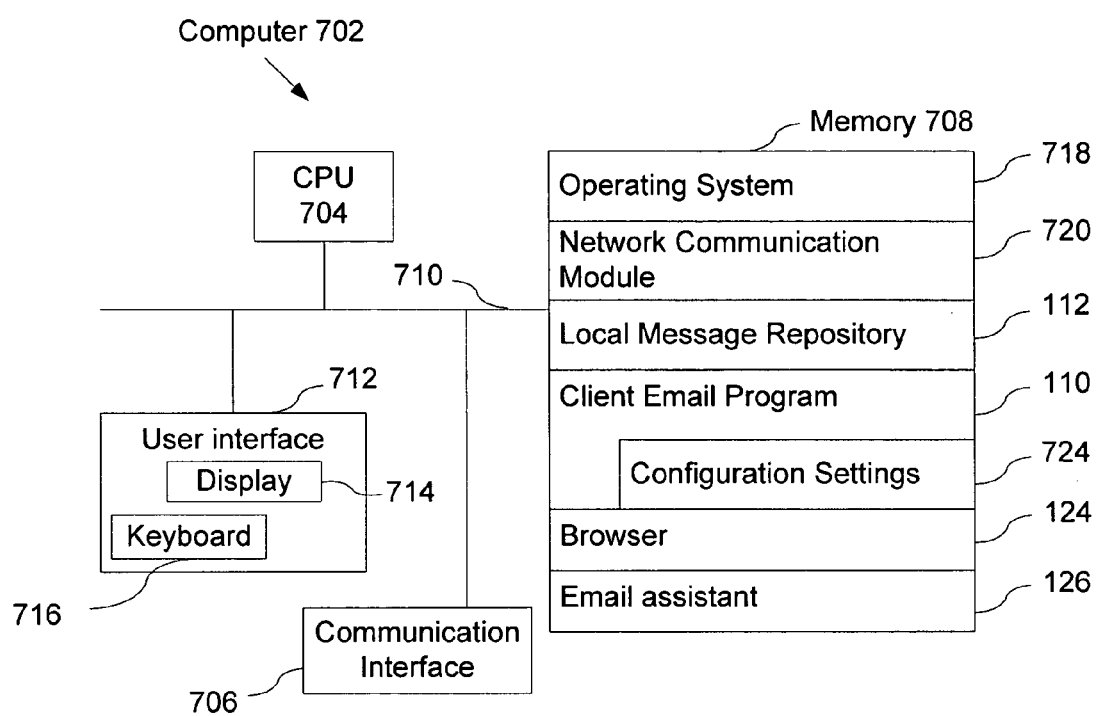
FIG. 7 depicts a client computer in accordance with an embodiment of the present invention.

Referring to FIG. 7, an embodiment of a computer 702 that implements the methods described above includes one or more processing units (CPU's) 704, one or more network or other communications interfaces 706, a memory 708, and one or more communication buses 710 for interconnecting these components. The computer 702 may optionally include a user interface 712 comprising a display device 714 (e.g., for displaying system status information) and/or a keyboard 716 (e.g., for entering commands). The memory 708 may include high speed random access memory and may also include non-volatile memory, such as one or more magnetic or optical storage disks. The memory 708 may include mass storage that is remotely located from CPU's 704. The memory 708 may store the following elements, or a subset of such elements:
- an operating system 718 that includes procedures for handling various basic system services and for performing hardware dependent tasks;
- a network communication module (or instructions) 720 that is used for connecting the computer 702 to other computers via the one or more communications network interfaces 706 (wired or wireless), which in turn connect the computer 702 to other computers via one or more communication networks such as the Internet, other wide area networks, local area networks, metropolitan area networks, and so on;
- a local message repository 112 for storing messages; and
- a client email program (or instructions) 110 as described above, including configuration settings 724 containing various information about POP configuration settings for a user.

The memory 708 may optionally store other application programs, such as a browser application 124 and/or an email assistant 126 for accessing web servers and other computers via the Internet or other communication networks, and other data structures as well.

Figure 8:
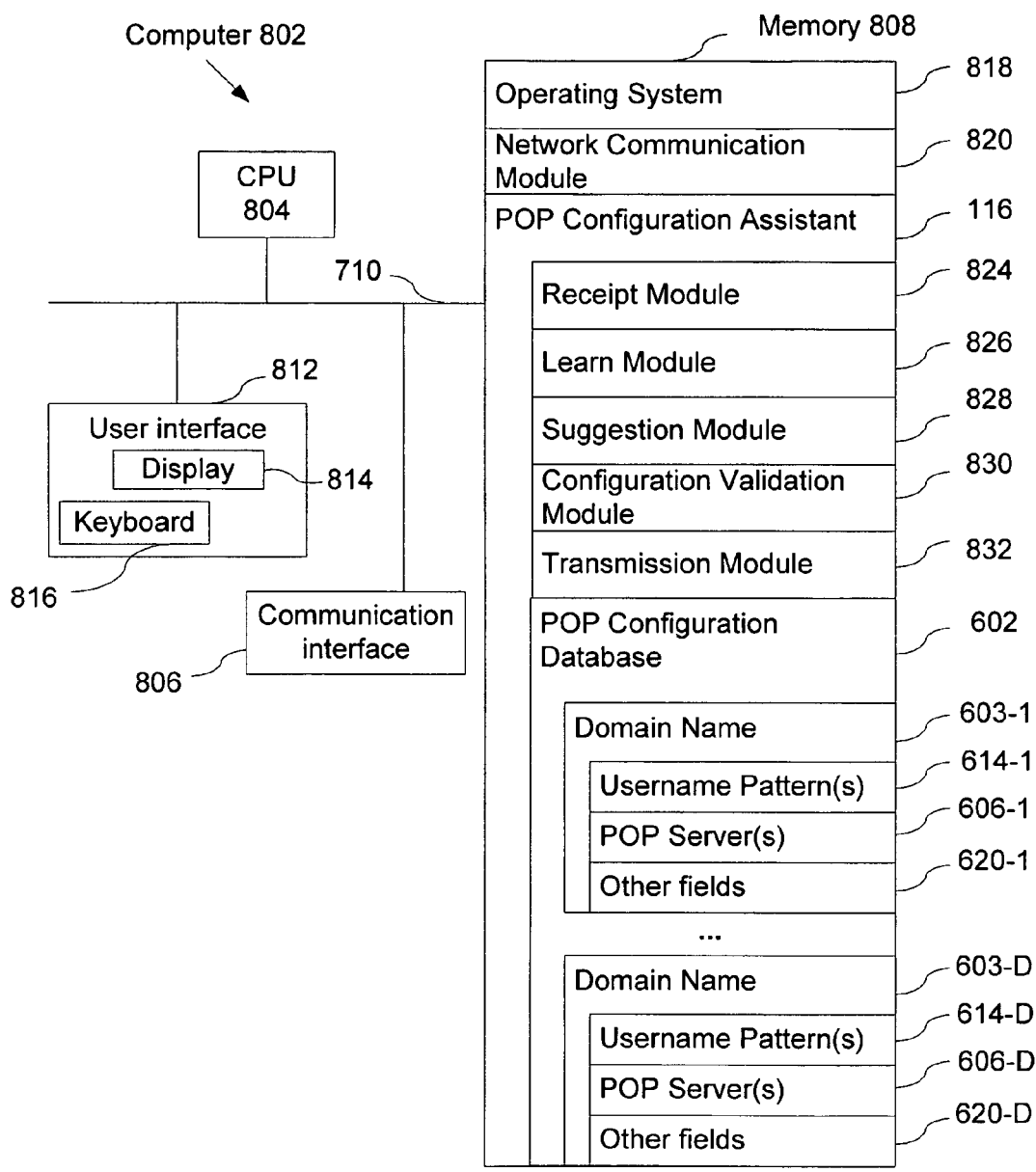
FIG. 8 depicts a server computer in accordance with an embodiment of the present invention.

Referring to FIG. 8, an embodiment of a computer 802 that implements the methods described above includes one or more processing units (CPU's) 804, one or more network or other communications interfaces 806, a memory 808, and one or more communication buses 810 for interconnecting these components. The computer 802 may optionally include a user interface 812 comprising a display device 814 (e.g., for displaying system status information) and/or a keyboard 816 (e.g., for entering commands). The memory 808 may include high speed random access memory and may also include non-volatile memory, such as one or more magnetic or optical storage disks. The memory 808 may include mass storage that is remotely located from CPU's 804. The memory 808 may store the following elements, or a subset of such elements:

an operating system 818 that includes procedures for handling various basic system services and for performing hardware dependent tasks;

a network communication module (or instructions) 820 that is used for connecting the computer 802 to other computers via the one or more communications network interfaces 806 (wired or wireless), which in turn connect the computer 802 to other computers via one or more communication networks such as the Internet, other wide area networks, local area networks, metropolitan area networks, and so on; and a POP configuration assistant (or instructions) 116 for communicating with a client email program, such as email client 110 (FIG. 1A), or with a browser 124 in a client computer or device 122 (FIG. 1B), to provide suggestions for various POP configuration settings and preferences.

In some embodiments, the POP configuration assistant 116 includes a receipt module (or instructions) 824 for receiving a request to provide suggestions user input such as the user's email address associated with the POP account or certain configuration settings; a learn module (or instructions) 826 for learning new configurations from validated user input as described above; a suggestion module (or instructions) 828 for providing configuration setting and preferences suggestions as described above; a configuration validation module (or instructions) 830 for detecting when user configuration settings produce a valid POP connection; a transmission module (or instructions) 832 for communicating suggestions to the email client 110; and a POP configuration database 602. In some embodiments, the POP configuration database 602 contains a number of domain name records 603-1 to 603-D, where D represents the number of domains for which records exist in the POP configuration database 602. Each domain record (e.g., 603-1) contains a POP server portion 606 (e.g., 606-1). A domain record 603 may additionally contain other fields 614, 620 for storing various other configuration and preference information. Although illustrated as part of the computer 802, the POP configuration database 602 could be distributed among a plurality of computers and portions of it could be located on the computer 802 while other portions or copies are located on other computers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The invention claimed is:

1. A method for providing remote message server configuration information, comprising:
   receiving an electronic mail address from a user;
   identifying, using at least a portion of the electronic mail address received, one or more field suggestions associated with a remote message server configuration field based on stored information; wherein the one or more field suggestions are identified using only the received electronic mail address and the stored information; and
   presenting to the user the one or more field suggestions in a graphical user display, wherein the presenting includes concurrently presenting to the user options for (A) selecting any of the one or more field suggestions and (B) entering a field value for the remote message server configuration field.

2. The method of claim 1, wherein the stored information is based on inputs from a community of users.

3. The method of claim 1, wherein the one or more field suggestions include at least one field suggestion for a username field.

4. The method of claim 1, wherein the one or more field suggestions include at least one field suggestion for a remote message server field.

5. The method of claim 1, wherein the presenting includes presenting a plurality of field suggestions in accordance with a ranking function.

6. The method of claim 5, wherein the ranking function is based on geographical information.

7. The method of claim 5, wherein the ranking function is based on a usage frequency.

8. The method of claim 1, further including:
   receiving from the user a modified field value comprising a modification of one of the field suggestions;
   validating the modified field value; and
   modifying the stored information based on the modified field value.

9. A method for providing remote message server configuration information, comprising:
   receiving from a client a request for remote message server configuration information, the request including an electronic mail address;
   identifying, using at least a portion of the electronic mail address received, one or more remote message server configuration patterns from a remote message server configuration database using at least a portion of the electronic mail address; wherein the one or more remote message server configuration patterns are identified using only the received electronic mail address and information from the remote message server configuration database; and
   in response to the request, providing to the client a plurality of options to be concurrently presented to a user of the client, the plurality of options comprising options for (A) selecting one of the one or more remote message server configuration patterns, and (B) entering a remote message server configuration field value.

10. The method of claim 9, wherein the remote message server configuration database includes information that is based on inputs from a community of users.

11. The method of claim 9, wherein the one or more remote message server configuration patterns include at least one field suggestion for a username field.

12. The method of claim 9, wherein the one or more remote message server configuration patterns include at least one field suggestion for a remote message server field.

13. The method of claim 9, wherein the providing includes providing a plurality of remote message server configuration patterns in accordance with a ranking function.

14. The method of claim 13, wherein the ranking function is based on geographical information.

15. The method of claim 13, wherein the ranking function is based on a usage frequency.

16. The method of claim 9, further including:
   receiving from the user a modified field value corresponding to one of the one or more remote message server configuration patterns;
   validating the modified field value; and
   modifying the remote message server configuration database based on the modified field value.

17. A client system for providing remote message server configuration information, comprising:
one or more processors; and
memory storing one or programs to be executed by the one or more processors, the one or more programs having instructions for:
receiving an electronic mail address from a user;
obtaining one or more field suggestions identified from a POP configuration database and based on at least a portion of the electronic mail address, the one or more field suggestions associated with a remote message server configuration field; wherein the one or more field suggestions are identified using only the received electronic mail address and information from the POP configuration database; and
presenting to the user the one or more field suggestions in a graphical user display, wherein the presenting includes concurrently presenting to the user options for (A) selecting any of the one or more field suggestions and (B) entering a field value for the remote message server configuration field.

18. The client system of claim 17, wherein the POP server configuration database includes information based on inputs from a community of users.

19. The client system of claim 17, wherein the remote message server configuration field is a username field.

20. The client system of claim 17, wherein the remote message server configuration field is a remote message server field.

21. The client system of claim 17, further including a ranking function, and
the instructions for presenting are configured to display a plurality of field suggestions in accordance with the ranking function.

22. The client system of claim 21, further including geographical information associated with the user, and
the ranking function includes a geographical component.

23. The client system of claim 21, further including a usage frequency associated with a respective field suggestion, and the ranking function includes a frequency component.

24. The client system of claim 17, further including:
instructions for validating a new field value from the user; and
instructions for modifying the stored information based on the new field value.

25. A server system for providing remote message server configuration information, comprising:
a POP configuration database including one or more configuration patterns associated with a domain;
one or more processors; and
memory storing one or programs to be executed by the one or more processors, the one or more programs having instructions for:
receiving from a client a request for remote message server configuration information, the request including an electronic mail address;
identifying the one or more remote message server configuration patterns using at least a portion of the electronic mail address and the POP configuration database; wherein the one or more remote message server configuration patterns are identified using only the received electronic mail address and information from the POP configuration database; and
in response to the request, providing to the client a plurality of options to be concurrently presented to a user of the client, the plurality of options comprising options for (A) selecting one of the one or more remote message server configuration patterns, and (B) entering a remote message server configuration field value.

26. The server system of claim 25, wherein the one or more configuration patterns are based on inputs from a community of users.

27. The server system of claim 25, wherein the one or configuration patterns are associated with a username field.

28. The server system of claim 25, wherein the one or configuration patterns are associated with a remote message server field.

29. The server system of claim 25, wherein the instructions for providing include ordering a plurality of field suggestions in accordance with a ranking function.

30. The server system of claim 29, further including geographical information associated with the user, and
the ranking function includes a geographical component.

31. The server system of claim 29, further including a usage frequency associated with a respective field suggestion, and
the ranking function includes a frequency component.

32. The server system of claim 25, wherein the one or more programs further including instructions for:
validating a new field value from a user; and
modifying the remote message server configuration database based on the new field value.

33. A non-transitory computer readable storage medium storing one or more programs to be executed by one or more processors, the one or more programs having instructions for:
receiving an electronic mail address from a user;
identifying, using at least a portion of the electronic mail address received, one or more field suggestions associated with a remote message server configuration field based on stored information; wherein the one or more field suggestions are identified using only the received electronic mail address and the stored information; and
presenting to the user the one or more field suggestions in a graphical user display, wherein the presenting includes concurrently presenting to the user as options for the user to (A) select any of the one or more field suggestions and (B) enter a field value for the remote message server configuration field.

34. The non-transitory computer readable storage medium of claim 33, wherein the stored information is based on inputs from a community of users.

35. The non-transitory computer readable storage medium of claim 33, wherein the one or more field suggestions include at least one field suggestion for a username field.

36. The non-transitory computer readable storage medium of claim 33, wherein the one or more field suggestions include at least one field suggestion for a remote message server field.

37. The non-transitory computer readable storage medium of claim 33, further including instructions for presenting a plurality of field suggestions in accordance with a ranking function.

38. The non-transitory computer readable storage medium of claim 37, wherein the ranking function is based on geographical information.

39. The non-transitory computer readable storage medium of claim 37, wherein the ranking function is based on a usage frequency.

40. The non-transitory computer readable storage medium of claim 33, further including:
instructions for receiving from the user a modified field value corresponding to one of the one or more suggested field suggestions;
instructions for validating the modified field value; and instructions for modifying the stored information based on the modified field value.

41. A non-transitory computer readable storage medium storing one or more programs to be executed by one or more processors, the one or more programs having instructions for:
- receiving from a client a request for remote message server configuration information, the request including an electronic mail address;
- identifying one or more remote message server configuration patterns from a remote message server configuration database using at least a portion of the electronic mail address; wherein the one or more remote message server configuration patterns are identified using only the received electronic mail address and information from the remote message server configuration database; and
- in response to the request, providing to the client a plurality of options to be concurrently presented to a user of the client, the plurality of options comprising options for (A) selecting one of the one or more remote message server configuration patterns, and (B) entering a remote message server configuration field value.

42. The non-transitory computer readable storage medium of claim 41, wherein the remote message server configuration database includes information based on inputs from a community of users.

43. The non-transitory computer readable storage medium of claim 41, wherein the one or more configuration patterns include at least one field suggestion for a username field.

44. The non-transitory computer readable storage medium of claim 41, wherein the one or more configuration patterns include at least one field suggestion for a remote message server field.

45. The non-transitory computer readable storage medium of claim 41, further including instructions for ordering a plurality of configuration patterns in accordance with a ranking function.

46. The non-transitory computer readable storage medium of claim 45, wherein the ranking function is based on geographical information.

47. The non-transitory computer readable storage medium of claim 45, wherein the ranking function is based on a usage frequency.

48. The non-transitory computer readable storage medium of claim 41, further including:
- instructions for receiving a modification in at least one of the options from the user;
- instructions for validating the modification in at least one of the options; and
- instructions for modifying the remote message server configuration database based on the modification in at least one of the options.

49. A system for providing remote message server configuration information, comprising:
- one or more processors; and
- memory storing one or programs to be executed by the one or more processors;
- the system including:
- means for receiving an electronic mail address from a user;
- means for identifying, using at least a portion of the electronic mail address received, one or more first field suggestions associated with a first POP configuration field based on stored information; wherein the one or more field suggestions are identified using only the received electronic mail address and the stored information; and
- means for presenting to the user the one or more first field suggestions in a graphical user display, wherein the means for presenting includes means for concurrently presenting to the user options for (A) selecting any of the one or more first field suggestions and (B) entering a field value for the first POP configuration field.

* * * * *